United States Patent Office 2,794,654
Patented June 4, 1957

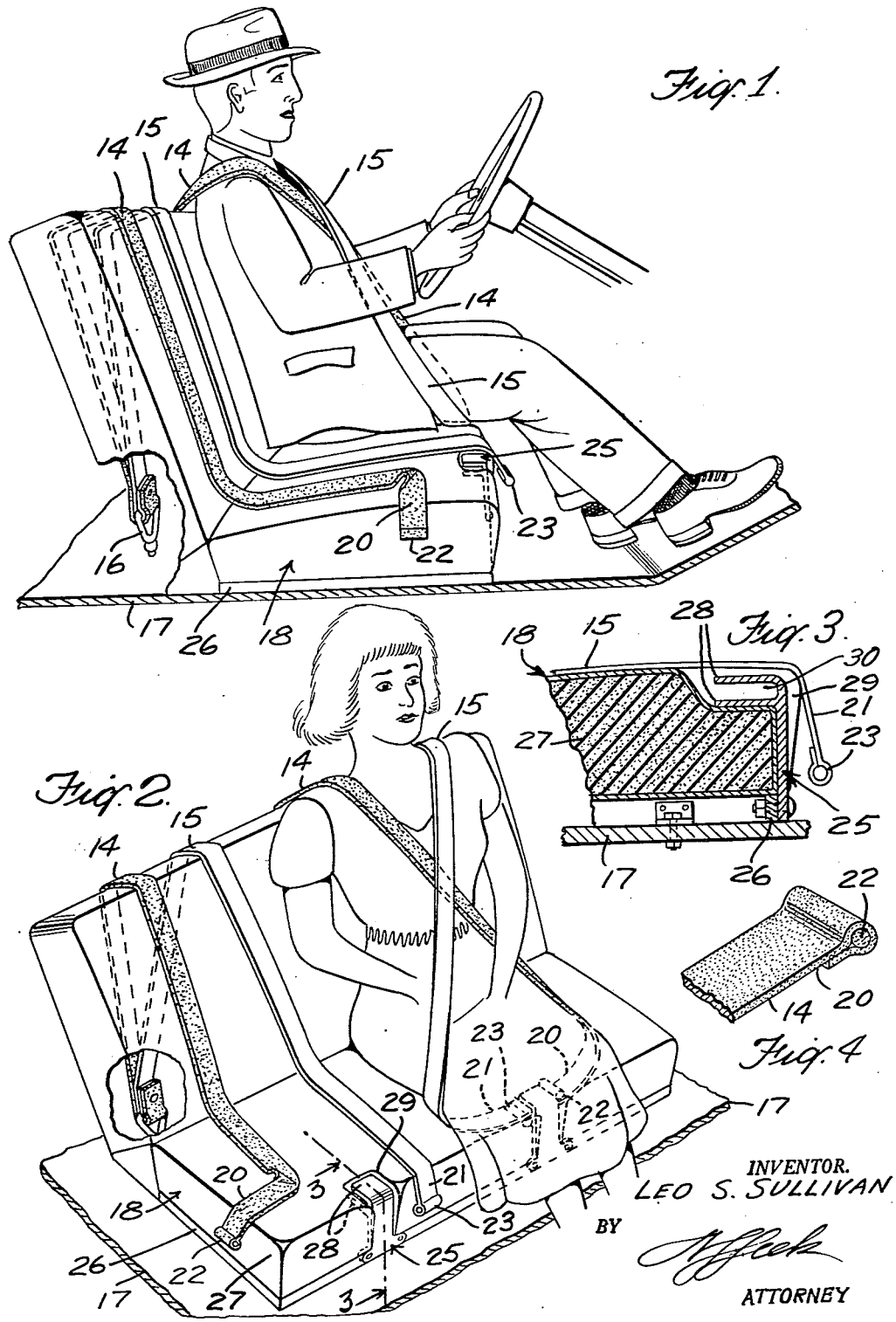

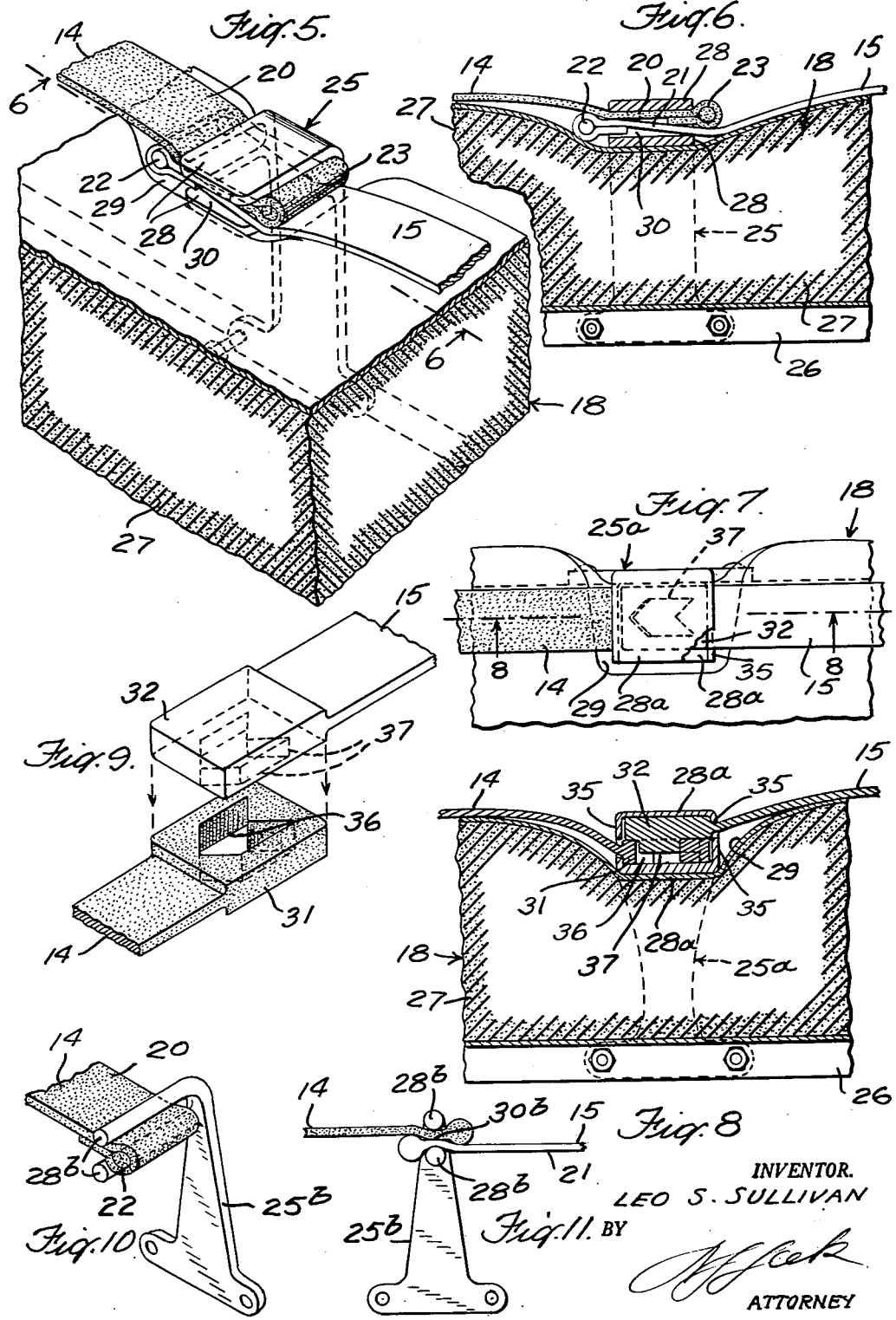

2,794,654

SAFETY BELT FOR VEHICLE SEATS

Leo S. Sullivan, Pelham, N. Y., assignor to The Russell Manufacturing Company, Middletown, Conn., a corporation of Connecticut Application April 12, 1956, Serial No. 577,872

8 Claims. (Cl. 280—150)

This invention relates to safety belts for passenger vehicles and more particularly to safety belts for passenger automobiles and to a method of securing the same.

An object of the invention is to provide a safety belt for passenger automobiles having novel and improved characteristics.

Another object is to provide improved means for attaching a safety belt to the vehicle.

Another object is to provide a safety belt of the above type having securing means which is readily releasable by one hand.

Various other objects and advantages will be apparent as the nature of the invention is more fully disclosed.

In accordance with the present invention the safety belt takes the form of one or a pair of straps, one end of which is anchored to the floor or frame of the vehicle in back of the seat in a position such that the strap may be passed from the back over a shoulder of the passenger, then across the chest of the passenger and beneath the legs. The free end of the strap is secured to a special bracket which is attached to the seat frame and is positioned below the top of the seat cushion. The bracket is so designed that the end of the strap can be readily slipped into place and may be removed with equal facility.

The nature of the invention will be better understood by referring to the following description, taken in connection with the accompanying drawings in which a specific embodiment thereof has been set forth for purposes of illustration.

In the drawings:

Fig. 1 is a side perspective view of the front seat of an automobile showing a seat belt embodying the present invention, with parts broken away for clarity;

Fig. 2 is a front perspective view of the front seat of an automobile showing the arrangement of the straps;

Fig. 3 is an enlarged fragmentary section taken on the line 3—3 of Fig. 2;

Fig. 4 is a detail view of the free end of a strap;

Fig. 5 is an enlarged perspective detail view showing the crossed ends of a pair of straps secured to the seat bracket;

Fig. 6 is a section taken on the line 6—6 of Fig. 5;

Fig. 7 is a plan view of a portion of a seat cushion showing a modified form of bracket and belt;

Fig. 8 is a vertical section taken on the line 8—8 of Fig. 7;

Fig. 9 is a detail perspective view of the strap ends shown in Fig. 7;

Fig. 10 is a perspective view illustrating a further form of bracket embodying the present invention; and Fig. 11 is a detail view of the bracket of Fig. 10 showing two crossed straps secured therein.

Referring to the drawings more in detail, the invention is shown in Figs. 1 to 6 as comprising a pair of straps 14 and 15 each of which has an end secured to a ring 16 which is bolted or otherwise secured to the floor or frame 17 of the automobile in back of the front seat 8. A pair of such straps is secured in a similar way in back of each passenger.

The straps 14 and 15 extend upwardly over the back of the seat and are adapted to be passed over the two shoulders and across the chest of the passenger as shown in Figs. 1 and 2, the free ends 20 and 21 of the straps pass under the legs and are anchored in the manner to be described. The ends 20 and 21 are provided with enlarged rolls 22 and 23 which form securing heads.

A bracket 25 is attached to the seat below the seat cushion 27 and extends upwardly in front of the seat and is formed with a bifurcated end comprising flanges 28 which extend rearwardly in a depression 29 in the seat cushion 27. The flanges 28 are spaced to provide a slot 30 therebetween which is of a size to receive the crossed ends 20 and 21 of two superimposed straps 14 and 15 with the beads 22 and 23 disposed on opposite sides of the flanges as illustrated in Fig. 5.

The arrangement is such that the ends 20 and 21 can be readily inserted in the slot 30 from the rear and the beads 22 and 23 prevent the straps from being pulled out of the bracket when the straps are under tension. When relaxed however the ends 20 and 21 can be easily pushed out of the slot 30 rearwardly to release the straps.

The flanges 28 may be depressed somewhat below the cushion to protect the passenger from contact with the bracket. The bracket 25 may terminate below the top of the seat 26 in which event the slot 29 may open downwardly so that the straps will be firmly secured by the upward pull produced by the usual forward movement of the body but are readily releasable in a downward direction after the pull on the straps has been terminated.

The straps 14 and 15 are normally laid across the back of the seat as shown in Figs. 1 and 2 when not in use. The straps are readily crossed over the shoulders of a passenger and the ends are anchored in the slot 30 between the flanges 28 of the bracket 25 as shown. In the event of a sudden stoppage of the vehicle as in an accident the forward thrust of the shoulders of the passenger will be opposed by the straps which will prevent the body from hinging forwardly around the waist. The portions of the straps which extend around the thighs also hold the lower part of the body in place and prevent the passenger from being thrown forwardly out of the seat. However, as soon as the vehicle comes to rest the tension of the straps is relieved and the ends of the straps can be pushed rearwardly out of the slot 30 to release the passenger.

It will be noted that since no buckle is used the straps can be released with one hand or by a suitable movement of the body of the passenger. Hence the straps can be readily released even though the passenger may be partially incapacitated.

Referring to Figs. 7, 8 and 9, the general arrangement of the straps is similar to that described above. In this embodiment however the straps terminate in thickened shoulder portions 31 and 32 respectively and flanges 28a of the bracket 25a are provided with inwardly extending lips 35 which form sockets adapted to receive the shoulder portions 31 and 32 of the straps and to secure the straps against removal by a transverse pull.

In order to further strengthen the straps an interlock is shown in the form of a recess 36 in the shoulder portion 31 of one strap and a registering boss 37 on the corresponding portion of the shoulder 32 of the other strap. The boss 37 is adapted to engage the recess or opening 36 as shown in Fig. 8 for securing the ends of the straps together and thereby absorbing a portion of the strain which would otherwise be transferred to the bracket 25a.

The straps of Figs. 7 to 9 are readily put in place by placing the shoulder portions in contact with the recess 36 and boss 37 interlocked, and sliding the straps into the slot between the two opposed flanges 28a of the bracket 25a. The straps may of course be released by reversing the movement and sliding the two shoulder portions 31 and 32 rearwardly out of the slot between the flanges 28a.

The embodiment shown in Figs. 10 and 11 is similar to that above described except that the bracket 25b of these figures is provided with a pair of rear projecting pins 28b forming a slot 29b therebetween. The end 20 of a strap 14 is inserted in the slot 29b as in the case of Figs. 1 to 6. Fig. 10 shows a single strap anchored in the slot 29b, and Fig. 11 shows a pair of crossed straps having overlapped ends 20 and 21 anchored in the slot 29b.

Although certain specific embodiment of the invention have been shown for purposes of illustration it is to be understood that various changes and adaptations may be made therein as will be apparent to a person skilled in the art.

What is claimed is:

1. A safety device of the character described for a passenger vehicle seat having a back, said device comprising an elongated strap having an enlarged transversely extending head on one end thereof, means by which the unheaded end of said strap is permanently anchored in fixed position behind a vehicle seat, and securing means disposed in front of said seat by which the headed end of said strap is releasably secured in fixed position under a leg of a passenger sitting on said seat for quick release by either hand of said passenger or by the rearward movement of the passenger on said seat; said securing means comprising an upwardly extending arm which is secured in fixed position in front of said seat, a pair of similar vertically spaced parallel rearwardly projecting members secured to said arm adjacent the upper end thereof which members provide a slot therebetween which is open at both sides and the rear end thereof and is of lesser depth than the thickness of said head; said strap being adapted to extend forwardly over the back of said seat and a shoulder of a passenger on said seat and downwardly diagonally across the chest of the passenger and transversely under a leg of the passenger and then be inserted into said slot from the open rear end thereof with the said head of said strap engaging vertically opposed sides of said rearwardly projecting members.

2. A safety device as defined in claim 1 in which said arm and said rearwardly projecting members are disposed below the top of said seat.

3. A safety device as defined in claim 1 in which said rearwardly projecting members comprise a pair of substantially rectangular similar flat flanges.

4. A safety device as defined in claim 1 in which said rearwardly projecting members comprise a pair of similar substantially cylindrical pins.

5. A safety device of the character described for a passenger vehicle seat having a back, said device comprising two similar elongated straps each of which has an enlarged transversely extending head on one end thereof, means by which the unheaded ends of said straps are permanently anchored in fixed position behind a vehicle seat, and securing means disposed in front of said seat by which the headed ends of said straps are releasably secured in fixed positioin under the legs of a passenger sitting on said seat for quick release by either hand of said passenger or by the rearward movement of said passenger on said seat; said securing means comprising an upwardly extending arm which is secured in fixed position in front of said seat, a pair of similar vertically spaced parallel, rearwardly projecting members secured to said arm adjacent the upper end thereof which members provide a slot therebetween which is open at both sides and the rear end thereof and is of a lesser depth than the thickness of said heads; said straps being adapted to extend forwardly over the back of the seat and the shoulders of a passenger sitting on said seat and downwardly from each shoulder diagonally cross the chest of the passenger and transversely in opposite directions under the legs of the passenger and then be inserted into said slot from the open rear end thereof in overlapping relation with the head on one of said straps engaging one side of the lower of said members and the head on the other of said straps engaging the side of the upper of said members which is opposite the said one side of the lower of said members.

6. A safety device as defined in claim 5 in which said arm and said rearwardly projecting members are disposed below the top of said seat.

7. A safety device as defined in claim 5 in which said rearwardly projecting members comprise a pair of substantially rectangular similar flat flanges.

8. A safety device as defined in claim 5 in which said rearwardly projecting members comprise a pair of similar substantially cylindrical pins.

References Cited in the file of this patent

UNITED STATES PATENTS

| | | |
|---|---|---|
| 1,973,011 | Morrison | Sept. 11, 1934 |
| 2,051,381 | Kivlin | Aug. 18, 1936 |
| 2,263,348 | Barros | Nov. 18, 1941 |
| 2,365,626 | Carlisle | Dec. 19, 1944 |
| 2,710,649 | Griswold et al. | June 14, 1955 |

FOREIGN PATENTS

| | | |
|---|---|---|
| 340,311 | Germany | Sept. 7, 1921 |
| 278,963 | Great Britain | Oct. 20, 1927 |